United States Patent [19]

Blachford

[11] 3,994,845

[45] Nov. 30, 1976

[54] VIBRATION DAMPING SHEET

[75] Inventor: John Blachford, Westmount, Canada

[73] Assignee: H. L. Blachford Limited, Montreal, Canada

[22] Filed: Aug. 26, 1974

[21] Appl. No.: 500,515

[52] U.S. Cl. .......................... 260/23 R; 260/30.4 R; 260/30.6 R; 260/30.8 R; 260/31.2 R; 260/31.6; 260/31.8 R; 260/33.8 UA; 260/42.22; 260/42.43; 260/42.47; 260/42.49; 260/42.52; 264/175; 264/211; 428/306; 428/315

[51] Int. Cl.² ...................... C08K 3/00; C08K 3/34; C08L 91/00

[58] Field of Search ............ 260/42.52, 42.22, 23 R, 260/30.4 R, 30.6 R, 30.8 R, 31.2 R, 31.6, 31.8 R, 33.8 UA, 42.43, 42.49, 42.47; 161/163, 171

[56] References Cited

UNITED STATES PATENTS

| | | | |
|---|---|---|---|
| 3,271,188 | 9/1966 | Albert et al. | 161/218 |
| 3,399,103 | 8/1968 | Saher et al. | 161/218 |
| 3,489,242 | 1/1970 | Gladding et al. | 161/162 |
| 3,502,611 | 3/1970 | Palymer et al. | 260/42.49 |
| 3,503,919 | 3/1970 | Cadus | 260/42.18 |

FOREIGN PATENTS OR APPLICATIONS 824,339  11/1959  United Kingdom

*Primary Examiner*—James H. Derrington
*Attorney, Agent, or Firm*—Alan Swabey & Co.

[57] ABSTRACT

A self supporting, mouldable vibration damping sheet having a large filler content is made of polyvinyl acetate and a filler; the filler is a mixture of a platelet filler such as mica and a non-platelet filler such as clay.

10 Claims, 3 Drawing Figures

VIBRATION DAMPING SHEET

BACKGROUND OF INVENTION a. Field of the Invention

This invention relates to self-supporting, mouldable, vibration damping sheets, to methods of manufacturing them and to vibration damped systems utilizing such sheets.

b. Description of Prior Art

It is well known that noise emanates from a structure excited to resonant vibration. An example would be the noise produced by a gong after it has been struck by a hammer. The amount of this noise can be drastically reduced by the application of a layer of a vibration damping compound to the surface of the structure subjected to excitation.

Vibration damping compounds are frequently applied to such structures as automobile doors, electric typewriter housings, air conditioning ducts, motor housings, grinder housings, and air-compressor housings.

Various methods of applying the damping compounds have been employed. If the compound is in the form of a sheet it may be adhered to the structure, if in the form of a putty it may be trowelled on, and if in the form of a paint it may be sprayed or painted on.

These are two types of vibration damping. If there is a layer of stiff, rigid material adhered to the outer surface of the damping compound, "constrained layer" damping is said to occur. If there is no such constraining layer, the damping is referred to as "free-layer" or "extensional" damping.

Many different compounds have been used as free layer vibration dampers. Some are based on rubber or other elastomers, while others are based on asphalt, and others, on thermoplastic or thermosetting polymers. Such materials have not generally been satisfactory because on the basis of a given thickness or weight their damping effectiveness has been low and they often dampen vibration over only a narrow range of frequency and temperature. Furthermore, for certain applications many of them do not possess the necessary stability to air, water, heat, light, fuels, lubricants, abrasion, impact, etc. Very few of them can be manufactured as a self-supporting sheet and still fewer are capable of being produced as a sheet which can subsequently be moulded to a substrate. Some which are in sheet form are difficult to adhere well to the vibrating structure. Others are so rigid that they cannot be adhered to a curved surface.

Particularly effective free-layer vibration damping compounds have been based on thermoplastic polymers. For example, U.S. Pat. No. 3,399,103 describes the use of a copolymer of ethylene and vinyl chloride; U.S. Pat. No. 3,489,242 describes the use of polyurethane, and ethylene/vinyl acetate copolymer and others, and U.S. Pat. No. 3,271,188 refers to polymer mixtures comprising at least three polymers which differ in their second order transition temperature.

A vibration damping product which is used commercially on a large scale is made by mixing a filler of mica and clay with an emulsion of polyvinyl acetate containing some plasticizer, and then spreading the resulting aqueous mixture onto a backing to form a coating and drying it in an oven to drive off the water. This vibration damping sheet and the method of manufacturing it suffer from several disadvantages. The use of an emulsion of polyvinylacetate necessitates the use of an emulsifier which is retained in the coating; this emulsifier lowers the water resistance of the final coating to an extent which is not good. The drying operation must be carried out slowly, otherwise blisters form at the surface of the coating producing a commercially unacceptable product. Thus, the production time is lengthened and careful monitoring is required to assure an acceptable product.

A further disadvantage of this existing process is that it requires the use of a backing, which may be, for example, a textile fabric; this backing which is unnecessary acoustically is expensive and increases the cost of the final product. Furthermore, the backing renders the final vibration damping product non-mouldable.

Another serious disadvantage in this existing process is that the amount of filler that can be added, for a given total solids content, is limited by the maximum viscosity permissible to allow spreading or spraying of the aqueous coating mixture on the backing. On a dry basis, the maximum filler content is approximately 60% by weight when mica and clay are used. This is a serious drawback because if more filler could be added the vibration damping product would be cheaper, and as we have now discovered the damping would be greater and would also be effective over a broader temperature range.

SUMMARY OF INVENTION

It is an object of this invention to provide a vibration damping product and a method of manufacture which are free of many of the previously mentioned objectionable characteristics.

It is a further object of this invention to provide a vibration damping sheet based on polyvinyl acetate which is self-supporting and mouldable.

It is a further object of this invention to provide a vibration damping sheet based on polyvinyl acetate which has a large content of filler and has good vibration damping properties.

It is a further object of this invention to provide a vibration damping sheet which is relatively inexpensive, non-toxic, and has good resistance to heat, light, water, lubricants, fuel oils, abrasion and impact.

It is a further object of this invention to provide a process by which the vibration damping sheet can be manufactured, using raw materials free from water and solvents which consistently produces a commercially acceptable product.

It is a further object of this invention to provide vibration damping systems utilizing a mouldable, self-supporting vibration damping sheet based on polyvinylacetate.

It is a further object of this invention to provide a vibration damping sheet which is of light colour and which can be readily obtained in a variety of colours by the use of pigments.

According to one aspect of the invention, there is provided a self-supporting, mouldable, vibration damping sheet comprising a mixture of polyvinyl acetate and a comminuted solid inorganic filler mixture; said filler mixture comprising at least one filler in platelet form and at least one filler in non-platelet form, said filler mixture comprising particles in the size range from about 5 to about 250 microns; said filler mixture comprising from about 50 to about 85% by weight of the sheet.

According to another aspect of the invention, there is provided a process for manufacturing a self-supporting, mouldable vibration damping sheet which comprises fusing together at a temperature in the range from about 220° to about 280° F a composition comprising pellets of polyvinyl acetate, said pellets having a diameter of from about 5 to about 15 mm, and a comminuted solid inorganic filler mixture comprising at least one filler in platelet form and at least one filler in non-platelet form; said filler mixture comprising particles in the size range from about 5 to about 250 microns; said composition comprising from about 10 to about 50% by weight of polyvinyl acetate and from about 50 to 85% by weight of filler mixture; to form a particulate mass of homogeneous composition; and subjecting said particulate mass to sheeting means to form said sheet.

According to another aspect of this invention, there is provided a vibration damping system comprising a metal substrate having adhered thereto a constrained or unconstrained layer comprising the above-described vibration damping sheet of this invention.

In a preferred embodiment of the invention a plasticizer for the polyvinyl acetate is included in the sheet.

In the sheet of the invention it is thought that some of the polymer molecules and the platelet filler are oriented during the sheeting operation, particularly those close to the surface of the sheet; further it is thought the proportion of the total polymer molecules and platelet filler orientated increases as the thickness of the sheet decreases. While Applicant does not wish to be bound by any particular theory it is thought that orientation of the platelet filler produces a greater resistance to water and organic solvents than would be found in a non-orientated product such as a moulded product; orientation may also contribute to the strength, flexibility and mouldability of the sheet.

COMPOSITION OF VIBRATION DAMPING SHEET a. Polyvinyl Acetate

The polyvinyl acetate used in this invention is a thermoplastic polymer which may suitably be preprared by polymerization of vinyl acetate with a suitable catalyst for example a peroxide catalyst; such polyvinyl acetate is readily available commercially and finds widespread use in latex paints, adhesives, coatings, binders and as a component in lacquers and plastic wood. It is available in the form of pellets, has a rubbery texture and cannot be ground into fine particles; pellets having a diameter of from about 5 to about 15 mm are suitable for this invention; with 5 to 10 mm and preferably 7 mm preferred.

It has been found that polyvinyl acetate gives good damping over a fairly wide temperature range, and results in a damping sheet which is flexible and can easily be adhered to surfaces of structures the vibrations of which are to be damped.

Polymers such as polyvinyl acetate are often defined in terms of their properties such as their intrinsic viscosity of melt index, rather than their Molecular Weight.

The polyvinyl acetate employed in the present invention should have an intrinsic viscosity which is not too high since otherwise the resulting sheet will be too stiff; on the other hand, the intrinsic viscosity should not be too low otherwise the resulting sheet will lack tear strength.

The intrinsic viscosity of a polymer is related to the Molecular Weight M by the equation:

$$\text{instrinsic viscosity (decalitres/gram)} = K\, M^a$$

wherein $K$ and $a$ are constants dependent on the solvent used and the method of determining $M$.

Suitably the polyvinyl acetate used in the present invention has an intrinsic viscosity when measured using cyclohexanone at 20° C as the solvent of between 0.1 dl/g and 0.9 dl/g and preferably is in the range of 0.2 dl/g to 0.8 dl/g.

It is also within the scope of the invention to use copolymers of polyvinyl acetate in which up to about 20% of the vinyl acetate units are replaced by other groups. For example, if the polyvinyl acetate is partially hydrolyzed, the polymer will contain vinyl alcohol units which would not be particularly harmful although the water resistance of the final sheet would be reduced. Further, such alcohol groups could be reacted with an aldehyde to form acetal groups.

Other units, for example vinyl chloride, might also be substituted for vinyl acetate units and these will readily be appreciated by those in the art without the necessity of including an exhaustive list here.

Of course the presence of such units may modify the properties of the final sheet to some extent, for example, replacement of some acetate groups with butyral or formal groups would result in a stiffer sheet and would require the use of plasticizers of flexibilizers. However, providing not more than 20% of the vinyl acetate units are replaced by appropriate units the resulting sheet should be satisfactory.

In this specification, such copolymers are included in the term "polyvinyl acetate".

b. Filler Mixture

The nature and amount of the inorganic fillers present in the damping composition have an important effect on the extent of damping and on how this is affected by temperature and frequency.

The fillers should be water-insoluble and should have melting points, above the temperature at which the mixture will be worked; thus the fillers should not melt or fuse together during manufacture of the sheet but should retain their discrete particulate form.

Two different types of inorganic filler are used, one having a platelet form, the other having a non-platelet form.

The filler which is in platelet form may be for example, mica, talc, flaked aluminum, flaked lead, graphite, etc. Mica has been found to be particularly effective and does not unduly affect the colour of the final sheet. Graphite is much less preferred since it results in a black product. The particle size should be in the range of 5 to 250 microns. There is a small improvement in damping as the particle size of the mica decreases and as its aspect ratio increases.

Various non-platelet fillers may be employed, for example, clay, calcium carbonate, barytes, silica and iron powder. The particle size should be in the range of 5 to 250 microns. Generally, as the particle size decreases the extent of damping increases. Clay is a preferred non-platelet type filler.

It will be understood that the particles of filler will not necessarily be of the same size and that there may be particles from throughout the specified size range. Generally, the non-platelet and platelet fillers will be employed in approximately the same amount by weight.

A synergistic effect is exhibited between the platelet and non-platelet fillers. As a critical concentration ratio of the two there is a maximum in the extent of damping for a given total filler loading. The value of this ratio depends upon the nature of the fillers and their particle size. When 325 mesh waterground mica is used with 325 mesh clay the optimum ratio is between 1.0:1.0 and 1.2:1.0 of mica to clay by weight. Generally the weight ratio of mica to clay will be from 0.75:1 to 1.25:1.

The total amount of filler employed should be as high as possible; because, as the amount increases the damping improves and there is a very significant broadening in the plot of damping versus temperature. The upper limit in filler content is determined by the required physical and mechanical properties of the final sheet, such as, flexibility, tear strength and mouldability. For the preferred mica/clay combination, the total filler concentration lies in the range of 55 to 85% and preferably 65 to 75% by weight of the total damping composition. By using the mixing method of the invention described below it is possible to achieve very high filler content.

c. Other Additives

A plasticizer may optionally be added to the damping composition. It is added to reduce the glass transition temperature and thereby the temperature at which maximum vibration damping occurs. The plasticizer, when used, may be any material which plasticizes the polyvinyl acetate and is compatible with it. As the amount of plasticizer added is increased, up to a high percentage, the temperature at which peak damping occurs will decrease; but, the extent of damping will not change. For most applications covering a broad temperature range, between 0 and 50 parts by weight of the plasticizer for 100 parts of polyvinyl acetate can be used. When no plasticizer is added and the polyvinyl acetate has an intrinsic viscosity using cyclohexanone of 0.68, maximum damping occurs at approximately 120° F.

Suitable plasticizers are esters, for example, phthalates and phosphates. Examples of specific plasticizers are dimethyl phthalate, diphenyl phthalate, dibutyl phthalate, dicarbitol phthalate, diethyl phthalate, tributyl phosphate, tricresyl phosphate, triphenyl phosphate, butyl ricinoleate, polyethylene glycol di(2-ethylhexoate), N-ethyl toluene sulfonamide, and chlorinated polyphenyls.

When no plasticizer is added the vibration damping sheet tends to be rather rigid at room temperature. To reduce this rigidity a flexibilizer can be added which does not affect the temperature of peak damping. Suitable materials are polyvinyl chloride, nitrile rubber and ethylene/vinyl acetate copolymer. It is generally desirable to have no more than 100 parts by weight of flexibilizer per 100 parts of polyvinyl acetate. Because the addition of a flexibilizer, for a given filler content, reduces the extent of damping, the minimum amount for desired flexibility should be added.

When a plasticizer or flexibilizer is included in the sheet the content of polyvinyl acetate is suitably from about 10 to about 50% by weight; when there is no plasticizer or flexibilizer the content of polyvinyl acetate in the sheet should be about 15 to about 50% by weight.

Flame retardant materials may be added in amounts from 0 to 10% by weight. Examples of suitable materials are antimony oxide, zinc borate, barium borate, (bromopropyl) phosphite, and tricresyl phosphate. Heat and light stabilizers may also be added, for example metal salts of the higher fatty acids, epoxidized fatty acid esters, and butyl hydroxy phenol.

To reduce sticking of the sheet to the rolls of the two roll sheeting mill approximately 1% by weight of an appropriate lubricant may be added, for example stearic acid, and glyceryl monostearate. Certain lubricants, for example paraffin wax and polyethylene are undesirable because they tend to migrate to the surface of the sheet making it difficult to adhere the sheet to the structural member the vibrations of which are to be dampened.

There may also be used in the damping composition additives such as pigments, dyes and extender resins as desired.

PROCESS

The process of the invention in essence comprises fusing the ingredients of the damping composition together to form an intimate homogeneous mixture and subjecting the mixture to a sheeting operation to form a sheet.

There are several methods which can be used for the production of the self-supporting vibration damping sheet. The ingredients can first be blended at room temperature, and then fed into a heated extruder in which fusion occurs, a twin screw extruder is particularly preferred in this embodiment. As the homogeneous plastic mass emerges from the output of the extruder, it can be forced through a sheeting die attached to the extruder or it can be delivered between the rolls of a two-roll sheeting mill.

Another manufacturing method would be to mix the ingredients in a Banbury Mixer at an elevated temperature so as to form a viscous mass which could then be passed through a two roll sheeting mill.

Yet another method would be to mix the ingredients on a hot two or three roll mixing mill and then pass the resulting material through a two roll sheeting mill.

In a preferred embodiment, I have developed a unique method which is much cheaper than any of those discussed above and which allows the incorporation of exceptionally large amounts of filler. This method employs a two roll sheeting mill in conjunction with a special type of high speed mixer which is customarily used to prepare dry blends containing large amounts of polyvinyl chloride, this high speed mixer is described in greater detail below.

It is important to appreciate that polyvinyl acetate is not a material conventionally used for making sheet products; more often it is found as a constituent of emulsions and liquid mixtures for example latex paints and lacquers. Polyvinyl acetate is not a material which is easily worked with other materials particularly solid materials, because of its rubbery nature and its inability to be ground into fine particles to facilitate mixing. In this respect, polyvinyl acetate is quite different from polyvinylchloride or polyethylene which are conventionally used in manufacturing sheet, moulded and extruded products. The later polymers are hard solids which can be ground into fine powders and mixed easily with other hard particulate solids such as inorganic fillers.

Consequently, it is quite unusual to find a polyvinyl acetate sheet product, and further the manufacture of such a product presents special problems because of the physical nature of polyvinyl acetate.

In mixing the ingredients of my damping composition together, heat is necessary to melt the polyvinyl acetate sufficiently to enable the formation of an intimate mixture, and further an intense mixing is necessary since the viscosity of the hot mixture is very high. Conventional mixers such as ribbon mixers and even the powerful sigma blade mixer are not adequate and form unmanageable lumps with the composition sticking to the blades.

In the process of fusion, it is important that the temperature of the mixture be within the range of 220° to 280° F preferably 250° to 275° F. If the temperature is much higher than the polyvinyl acetate degrades, and if it is much below it does not soften enough or requires an excessively long time to soften.

VIBRATION DAMPING SYSTEMS

The vibration damping sheet of this invention may be employed either in a constrained or unconstrained system although the latter is much preferred.

In using the moulded or flat, self-supporting damping sheets to reduce the vibration of structural elements, any means of bonding may be used for example, clamping or rivetting; however, for optimum damping, the sheet should be adhered by using an appropriate adhesive or by heating to a sufficiently high temperature and then pressing it hard against the structural part. When using an adhesive it has been found that its hardness is important. When the adhesive after setting is softer than the damping composition, it contributes somewhat to damping, but it also tends to reduce damping efficacy by reducing the actual straining of the damping material through losses to the less effectual adhesive layer. No such phenomenon is evident when the hardness of the set adhesive is equal to or greater than that of the damping composition. Therefore, a rigid, thermosetting adhesive is preferred, such as, an epoxy, furan, phenolic, melamine, urea, or polyester adhesive.

Self-supporting damping sheets made according to this invention are particularly effective in damping vibrations in situations where metal sheet structures are employed, as in automobiles, trucks, marine craft, snowmobiles and household appliances. The vibrations of non-metallic structures may also be dampened, such as plywood and hardboard building panels, and reinforced plastic sheets.

The damping obtained will depend on the ratio of the thickness of the damping sheet to that of the substrate, such as steel, the vibrations of which are to be damped. Damping increases approximately in proportion to the square of this thickness ratio. Generally, it is sufficient to have a ratio of between 1:1 and 2:1 of damping sheet to substrate.

BRIEF DESCRIPTION OF THE DRAWINGS

The invention is illustrated in preferred embodiments with reference to the accompanying drawings in which.

DESCRIPTION OF PREFERRED EMBODIMENTS

Figure 1:
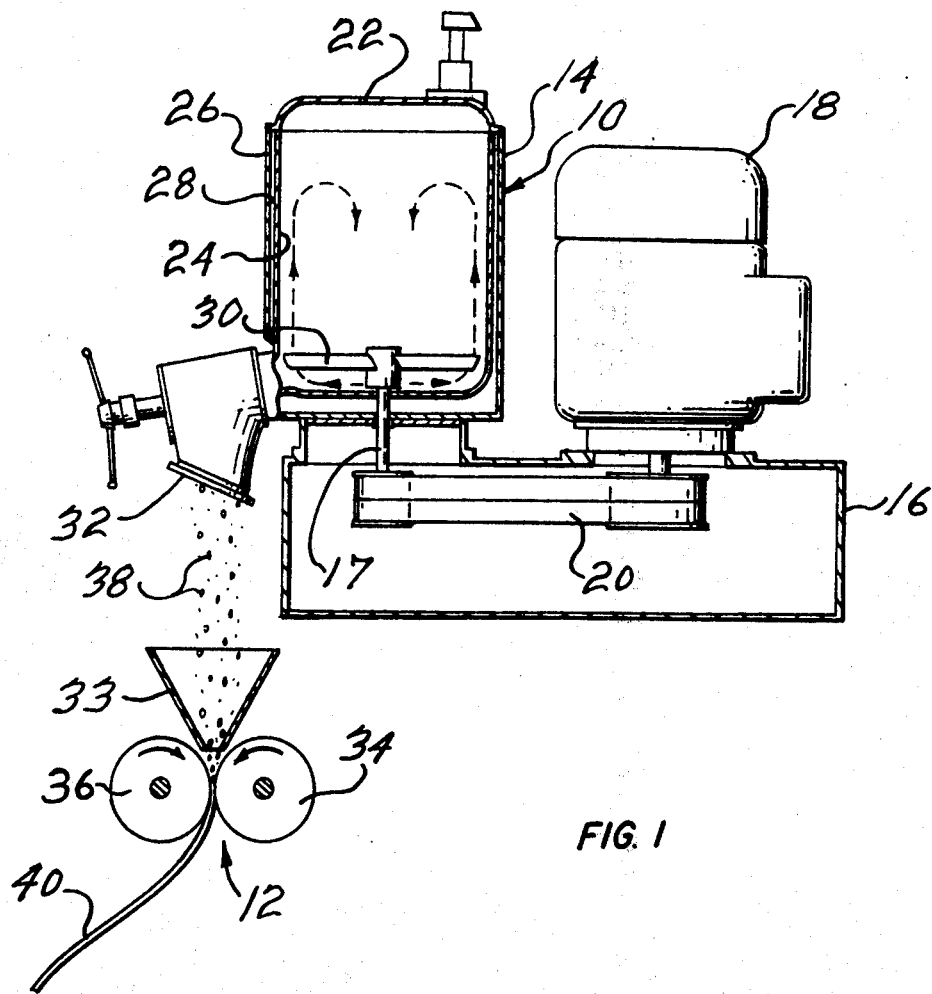
FIG. 1 illustrates diagrammatically apparatus suitable for carrying out the process of this invention.

With reference to FIG. 1, an apparatus for carrying out the process of the invention comprises a high speed mixer 10 and a two roll sheeting mill 12.

High speed mixer 10 comprises a cylindrical housing 14 and an electric motor 18 mounted on a base 16; housing 14 includes a shaft 17 driven by motor 18 through a pulley and V-belt arrangement 20.

The cylindrical housing 14 includes a lid 22 and inner and outer walls 24 and 26 respectively defining a jacket 28. In the lower region of cylindrical housing 14 an impeller 30 is mounted on shaft 17 and extending from said lower region is an outlet 32 which can be closed.

The two roll sheeting mill 12 comprises a hopper 33 and closely spaced rolls 34 and 36 adapted to rotate in the directions indicated by the arrows.

Particles of homogeneous composition 38 are shown falling from outlet 32 to the sheeting mill 12 which is producing a sheet 40; the particles are dry and flowable.

Suitable high speed mixers 10 are those made by Gunther Papenmeier KG and Henschel Corporation.

In operation, the ingredients of the damping composition are introduced at the top of the cylindrical housing 14 by raising lid 22; hot oil or steam is circulated in jacket 28 as a heating medium and the impeller 30 is set in motion.

When the impeller 30 is set in motion, the ingredients inside the housing 14 are thrown upwards and then cascade downwards, creating a central vortex effect above the central shaft 17 as shown in the drawing. There is violent agitation and two effects take place; first, by virtue of the central vortex, air is sucked into the blend of ingredients so that the material mass as a whole is fluidized and tends to flow very much in the same manner as a liquid; secondly, and perhaps more importantly, interparticle, particle-impeller and particle-vessel wall collisions occur. These collisions result in the creation of frictional heat and the absorption of heat from the inner wall 24. The polyvinyl acetate softens and with the intensive mixing action the fillers and any other additives present fuse with the polyvinyl acetate, forming particles the size of peas. If the mixing speed is low very large particles form which tend to fuse together into one solid lump and it is impossible to empty the mixture from the housing 14. Furthermore, there is a risk of burning out the motor 18 or of breaking the shaft 17. Because only small particles form which do not stick together much, it is possible to easily and quickly discharge the resulting homogeneous composition 38, and there is no risk of damaging the mixer.

When operating the mixer 10 for the production of the damping sheet 40, all of the ingredients can be added at once to the mixer 10, the lid 22 is closed and the impeller 30 is started at low speed. The choice of a low speed is to offset excessive power demands on start-up and also to gently homogenize the ingredients. After a few seconds, the speed is increased to "high". A high speed is maintained for several minutes to ensure complete fusion of the ingredients. The speed is then reduced to "low", the outlet 32 is opened, and the composition 38 is discharged.

The mass of particles which is of relatively uniform and homogeneous composition 38 leaves the mixer 10 via outlet 32 and falls into a hopper 33 which is situated between and above the rolls 34 and 36 of the two roll sheeting mill 12. The hopper 33 acts as a reservoir and permits the production of a continuous sheet of self-supporting vibration damping material 40.

There are several important variables to be considered when operating the mixer 10. The temperature of the oil or vapour in the jacket 28 should be such that the material in the mixer 10 reaches a temperature in the range of 220° to 280° F, as described above.

The speed of the impeller 30 should be in the range of 1500 to 2000 rpm. If the speed is below this, large particles form and there is a tendency for these to agglomerate into one solid lump. If the speed is above this, the power demand is excessive.

It has been found that it is sufficient to mix the ingredients at a high speed for between 8 and 20 minutes, depending upon the particular formulation used. If the time is shorter, incomplete mixing results and if it is longer, there is a risk of the polyvinyl acetate degrading significantly.

The rolls 34 and 36 of the two roll sheeting mill are suitably maintained at approximately room temperature by passing cold water through them. If they are much warmer the vibration damping compound tends to stick to them.

In a further embodiment of this invention, the self-supporting vibration damping sheet may be attached to a backing, such as thick urethane foam or a thin film of plastic, cloth or metal. This may be done by several methods. After the damping sheet has cooled a layer of adhesive may be applied to the sheet and on top of this a layer of the backing. A simpler method is to lay the backing onto the top of the sheet while it is still hot during production and then pass the two layers through a nip roll, the pressure resulting from which causes the backing to adhere well to the damping sheet. The preferred method is to pass the backing over one or both of the rolls of the two roll sheeting mill so that as the damping sheet is formed it is simultaneously adhered to the backing. If a layer of backing is passed over both rolls a sandwich construction results. A particularly valuable backing is flexible urethane foam because it has very good sound absorption properties, and therefore the composite sheet can be used as both a sound absorber and a vibration damper.

The thickness of the vibration damping sheet may be varied over a wide range depending on the end use; generally 1 to 12.5 mm includes most applications.

Not only is the vibration damping sheet of this invention self-supporting; but, it is also mouldable. It may be thermoplastically shaped at temperatures above 200° F. by various methods. The shaping operation may be carried out, for example, by deep drawing or vacuum forming. An especially favourable technique is to heat the sheet and then place it on top of a mould, the shape of which is that of a body panel of a vehicle or other device to which the premanufactured moulding damping sheet is to be applied later on. If the surface is not too complex the hot sheet will engage it by its own weight; otherwise, vacuum may be applied or the sheet may be forced by hand to take the desired shape.

EXAMPLES

The following examples serve to illustrate the invention, but they are not intended to limit it thereto.

EXAMPLE I

Self-supporting Vibration Damping Sheet Contaning Low Filler Content and Giving Peak Damping at Room Temperature Formulation B presented in Table I below was used. A high speed mixer of the type illustrated in FIG. 1 having a capacity of 8 liters, (Type TGAHK8 from Gunther Papenmeier KG) was charged with 3,000 g. of the formulation. Before charging, the oil circulating through the jacket of the mixer was brought to a temperature of 330° to 400° F. Immediately after charging the mixer, the impeller was run at low speed for a few seconds to uniformly mix the ingredients. The speed was then increased to 2,000 rpm. After running at this speed for 15 minutes, the speed was reduced to low, the outlet opened, and the batch discharged from the mixer.

The hot product from the mixer was in the form of particles, most of which were the size of peas. Each of these particles was completely homogeneous throughout, indicating that complete and thorough fusion had occurred.

The mass of hot particles was then converted into a 1.27 mm. thick sheet by passing it through a two roll sheeting mill, the rolls of which were 12 inches in width, 6 inches in diameter and rotated at 5 rpm.

The resulting sheet was self-supporting and on heating to 200° F could easily be moulded by hand or by vacuum.

Samples of this sheet were immersed in water, diesel fuel, and motor oil for 2 weeks without any signs of deterioration or swelling. In contrast to this, a sample of approximately the same composition, but prepared from an aqueous dispersion of the ingredients, involving an emulsion of polyvinyl acetate, showed almost complete deterioration after 2 weeks immersion in water.

TABLE I

CUZ,1/46 FORMULATION FOR EXPERIMENTAL SELF-SUPPORTING VIBRATION DAMPING SHEET

| SUPPLIER | MATERIAL | TRADE-NAME | FORMULATIONS IN WT. % | | | | | |
|---|---|---|---|---|---|---|---|---|
| | | | A | B | C | D | E | F |
| Union Carbide | Polyvinyl Acetate | AYAT | 31.4 | 22.3 | 17.0 | 26.8 | 19.8 | 26.0 |
| English Mica Co. | Mica | Mica 325 | 36.6 | 42.6 | 45.8 | 42.6 | 36.0 | 34.0 |
| Minerals & Chemicals Corporation | Clay | ASP 900 | 24.5 | 29.6 | 32.8 | 29.6 | 30.0 | 27.8 |
| Emery Industries Inc. | Stearic Acid | Emersol 420 | 1.0 | 1.0 | 1.0 | 1.0 | 1.0 | 1.0 |
| Union Carbide | Polyethylene Glycol di(2- | Flexol 4GO | 6.5 | 4.5 | 3.4 | — | — | 5.2 |

TABLE I-continued

CUZ,1/46 FORMULATION FOR EXPERIMENTAL SELF-SUPPORTING VIBRATION DAMPING SHEET

| SUPPLIER | MATERIAL | TRADE-NAME | FORMULATIONS IN WT. % | | | | | |
|---|---|---|---|---|---|---|---|---|
| | | | A | B | C | D | E | F |
| Corp. | ethylhexoate) | | | | | | | |
| Union Carbide Corp. | Polyvinyl Chloride | Geon 100-C13 | — | — | — | — | — | 6.0 |
| Polysar Corp. | Nitrile Rubber | Krynac 34-50 | — | — | — | — | 13.2 | — |

EXAMPLE II

The Vibration Damping Properties of the Sheet Produced in Example I

A piece of the sheet produced in Example I was adhered to a special 1.5 mm thick metal strip so as to completely cover one of its two main surfaces. The adhesive used was EC-1099 Industrial Adhesive (trademark of the 3M Company), which is a rubber cement. The coated strip was then clamped to a Complex Modular Apparatus (Type 3930 from Bruel & Kjaer). The material and metal strip were excited by a beat frequency oscillator (Type 1022 from Bruel & Kjaer), and the frequency was monitored using an electric counter (Mode 5211A from Hewlett-Packard). The resulting vibrations of the sample were amplified by means of a microphone amplifier (Type 2603 from Bruel & Kjaer) to determine the resonant peaks. By measuring the half-power band width, $\Delta f_n$(Hz), associated with the second, third and fourth resonances, the combined loss factor, $\eta$, was determined, where $\eta = \Delta f_n/f_n$ and $f_n$ is the resonant frequency in Hz. Loss factor is defined as the ratio of energy dissipated by the damping material to the total energy of the vibratory system for one cycle of vibration.

The effect of temperature on damping, as indicated by the loss factor, was determined by placing the entire Complex Modular Apparatus with sample attached in a controlled temperature chamber (Model SD11 from Statham). To ensure complete temperature equilibrium the samples were maintained at the given temperatures for four hours before testing.

Tests were also run to determine the effect of the thickness of the damping sheet on loss factor. This was done by preparing on the two roll mill sheets that were 1.27 mm, 1.905 mm and 2.54 mm in thickness and then adhering them to the metal strip of the Complex Modular Apparatus and determining the loss factor at different temperatures and frequencies.

Figure 2:
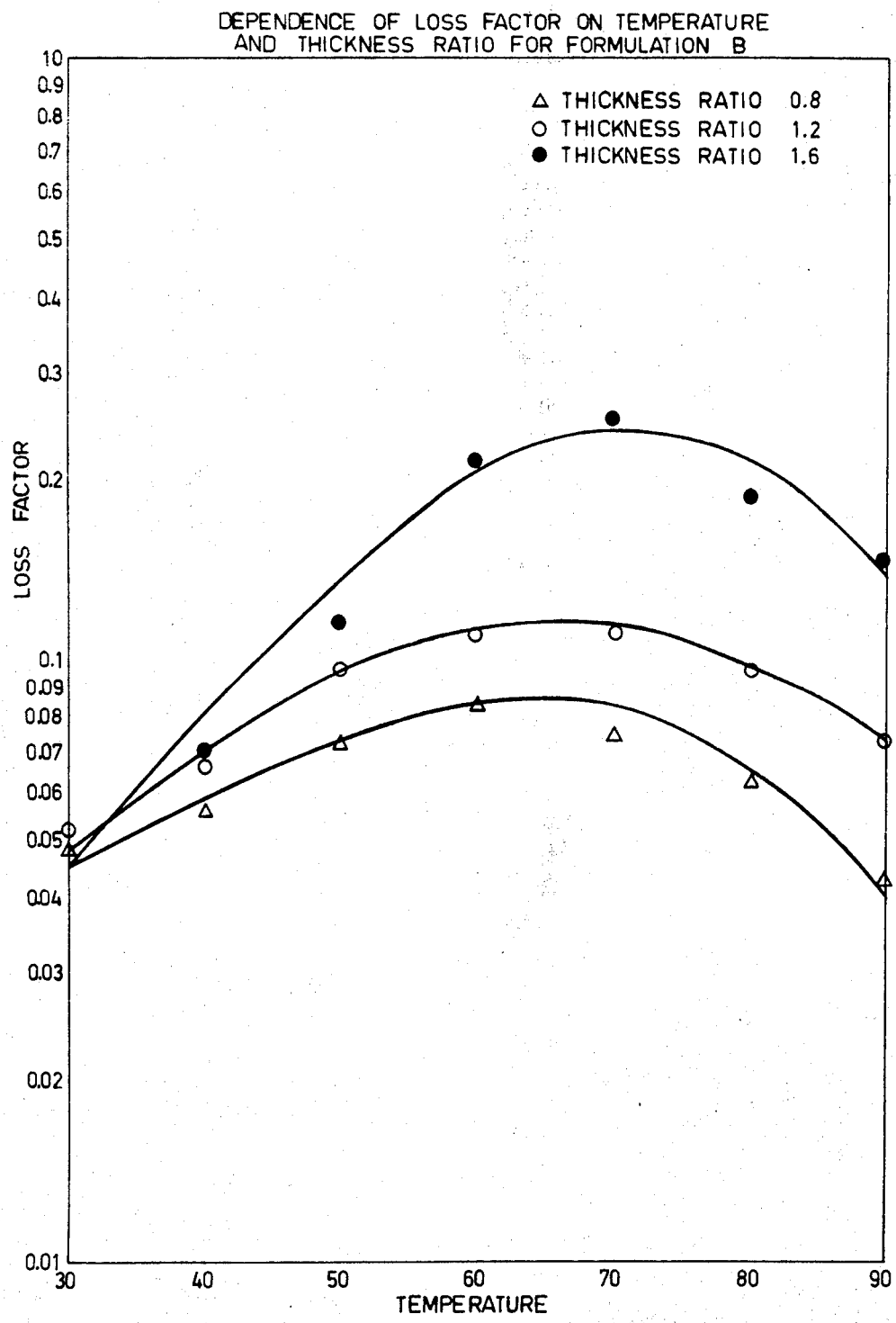
FIG. 2 illustrates graphically the relationship between loss factor and temperature for a sheet of formulation B of the invention (Example I) with different thickness ratios of damping sheet to metal substrate at a frequency of 100 Hz.

FIG. 2 presents plots of loss factor versus temperature for three thickness ratios and for a frequency of 100 Hz. It should be noted that peaked damping occurs at approximately 70° F. The loss factor increases rapidly at the thickness ratio increases. Calculations using the presented data show that the loss factor is approximately directly proportional to the square of the thickness ratio. This relationship is generally encountered with other vibration damping compounds and it is predicted theoretically.

As a general rule, a minimum loss factor of 0.1 is required to adequately control a vibrating metal structure. Depending upon the amount of noise reduction required, a loss factor of 0.2 or higher might be specified.

Table II below gives the values for loss factor at a thickness ratio of 1.6 and for three temperatures and three frequencies.

TABLE II

| | Frequency in Hz | | | | | |
|---|---|---|---|---|---|---|
| | 98 | 105 | 120 | 270 | 305 | 330 |
| 70° F | — | — | 0.26 | — | — | 0.25 |
| 80° F | — | 0.18 | — | — | 0.19 | — |
| 90° F | 0.12 | — | — | 0.14 | — | — |

These results indicate that over the frequency range investigated the loss factor is not significantly dependent on frequency. It has been found by others that even over the frequency range of 80 to 6,000 Hz there is only a small change in loss factor for polyvinyl acetate based damping compounds.

EXAMPLE III

Effect of Filler Content on the Loss Factor of Vibration Damping Sheets

Formulations A, B and C of Table I above were employed to make self-supporting damping sheets using the procedure described in Example I.

The resulting sheets were tested using a different procedure than described in Example II. Strips of each sheet which was 3.17 mm thick were adhered using an epoxy adhesive, Chembond, (trademark from H. L. Blachford, Limited) to one side of a cold drawn steel bar measuring 3.7 cm × 3.17 mm × 40 cm. This steel bar, with the coated surface facing up, was placed on two knife edges so that the nodal points of the bar which were 22 cm apart rested on the knife edges. The natural frequency of the bar was 100 Hz. A transducer, which was placed approximately 0.8 mm below the bar and at its centre, was connected to an amplifier (Model 2104 from Inco Instruments) which in turn was connected to a high speed oscillograph recorder (Model F10-100 from Southern Instruments). The centre of the steel bar was tapped with a soft rubber mallet and then the trace of the decaying motion of the bar was obtained from the recorder. Using this trace the loss factor $\eta$ was calculated from the following equation:

$$\eta = \frac{1}{\pi}\left(\frac{X_n - X_{n+1}}{X_n}\right)$$

where $X_n$ and $X_{n+1}$ are amplitudes, and $X_{n+1}$ leads $X_n$ by one cycle.

Figure 3:
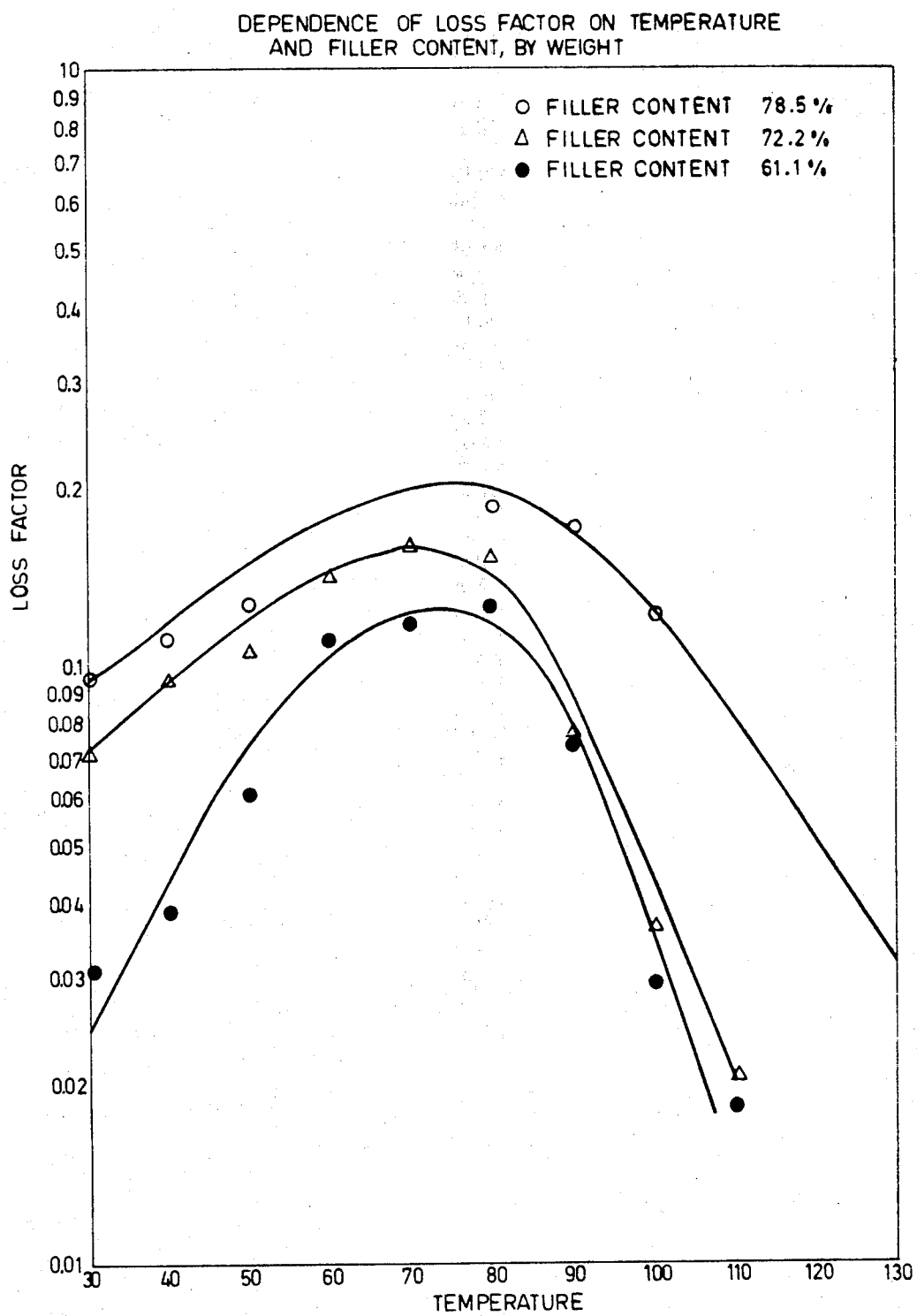
FIG. 3 illustrates graphically the relationship between loss factor and temperature with damping sheets of different filler content at a frequency of 100 Hz.

FIG. 3 presents the plotted results of loss factor versus temperature for the three formulations of Table I which contain varying amounts of total filler; namely, Formulation A with 61.1%, Formulation B with 72.2% and Formulation C with 78.6%. The plots show that as the filler content increases the peak loss factor increases and, more surprisingly, the effect of temperature on decreasing the loss factor is greatly reduced. This remarkable effect of increase in filler content is surprising and very valuable. The reduction in the effect of temperature is particularly valuable because for most applications the ambient temperature varies considerably, especially when, for example, the vibration damping sheet is used on an engine housing or on a door of a car or truck.

EXAMPLE IV

Effect of Plasticizer on the Temperature at Which Peak Damping Occurs

Self-supporting vibration damping sheets were prepared using Formulations B and D, and the procedure given in Example I. The sheets produced were 3.17 mm thick and were tested for damping as described in Example III.

It will be noted that Formulation B has 4.5% plasticizer; whereas, Formulation D has none. The filler contents of the two formulations is the same.

Both the sheets produced were self-supporting and could be moulded. The sheet from Formulation D was appreciably more rigid at room temperature, and had to be heated to 250° F before it could be easily moulded, instead of 200° F which was required for moulding of the sheet based on Formulation B.

The results of the damping experiments for the Formulation B sheet are shown in FIG. 3. Although the results for the formulation D sheet are not presented, it was found that they were nearly identical to those for the sheet based on Formulation B, except that the entire curve was shifted along the abscissa by 50° F so that the temperature at which the loss factor reached a maximum was 120° F, instead of 70° F.

EXAMPLE V

The Effect of Flexibilizers on the Loss Factor

Self-supporting vibration damping sheets were prepared using Formulations E and F, as shown in Table I, and the procedure given in Example I. The sheets produced were 3.17 mm thick and were tested for vibration damping as described in Example III. Formulation E is similar to Formulation D in that it does not include any plasticizer; however, the sheet produced using it, is considerably more flexible. This is because of the presence of 13.2% nitrile rubber. Although the vibration damping results for the sheet based on Formulation E are not presented, they show that the addition of nitrile rubber does not affect the temperature of peak damping. It was at 120° F; just as for Formulation D. The results, however, also show that the addition of the nitrile rubber significantly reduces the loss factor at all temperatures.

Completely analagous results were obtained using Formulation F. The sheet produced was more flexible than that based on the corresponding formulation which does not contain any flexibilizer, but does contain plasticizer, namely, Formulation A. For both sheets the maximum loss factor occurred at 70° F. However, for the sheet containing polyvinyl chloride, the loss factors were lower at all temperatures.

A flexibilizer, as distinct from a plasticizer which also tends to flexibilize, should only be added if it is desired to increase flexibility without changing the temperature of peak damping, provided a significant reduction in vibration damping at all temperatures is tolerable.

I claim:

1. A self-supporting, mouldable, vibration damping sheet comprising a mixture of a polyvinyl acetate having an intrinsic viscosity when measured using cyclohexanone at 20° C as the solvent of between 0.2 dl/g and 0.8 dl/g and containing at least 80% by weight of vinylacetate, a plasticizer and a comminuted solid inorganic filler mixture; said filler mixture comprising at least one filler in platelet form and at least one filler in non-platelet form selected from the group consisting of clay, calcium carbonate, barytes and iron powder; said filler mixture comprising particles in the size range from about 5 to about 250 microns and said filler mixture comprising from about 50 to 85% by weight of the sheet; said sheet being highly resistant to water and organic solvents.

2. A sheet according to claim 1, wherein said filler mixture is composed of mica and clay.

3. A sheet according to claim 2 in which the weight ratio of mica to clay is from 0.75 : 1 to 1.25 : 1.

4. A sheet according to claim 3 wherein the filler content is from 65 to 75% by weight of the sheet.

5. A sheet according to claim 1 including one or more additives selected from the group consisting of flameretardants, flexibilizers, stabilizers, dyes, pigments and extender resins.

6. A self-supporting, mouldable, vibration damping sheet comprising a mixture of a polyvinyl acetate having an intrinsic viscosity when measured using cyclohexanone at 20° C as the solvent of between 0.2 dl/g and 0.8 dl/g and containing at least 80% by weight of vinyl acetate, and a comminuted solid inorganic filler mixture; said filler mixture comprising at least one filler in platelet form and at least one filler in non-platelet form selected from the group consisting of clay, calcium carbonate, barytes and iron powder; said filler mixture comprising particles in the size range from about 5 to about 250 microns and said filler mixture comprising from about 50 to 85% by weight of the sheet; said sheet being highly resistant to water and organic solvents.

7. A sheet according to claim 6, wherein said filler mixture is composed of mica and clay.

8. A self-supporting, mouldable, vibration damping sheet comprising a mixture of
   i. 10 to 50% by weight of a polymer of vinyl acetate having an intrinsic viscosity when measured using cyclohexanone at 20° C as the solvent of from 0.2 dl/g to 0.8 dl/g, said polymer containing at least 80% by weight of vinyl acetate;
   ii. from 0 to 50 parts by weight of a plasticizer per 100 parts of said polymer;
   iii. from 0 to 100 parts by weight of a flexibilizer per 100 parts of said polymer;
   iv. from 50 to 75% by weight of a comminuted, solid inorganic filler mixture having a particle size in the range of 5 to 250 microns composed of mica and clay in which the weight ratio of mica to clay is from 0.75:1 to 1.25:1;
   said sheet being immersible in water, diesel fuel and motor oil for prolonged periods without any signs of deterioration or swelling.

9. A sheet according to claim 8 wherein said polymer is polyvinyl acetate containing essentially 100% vinyl acetate.

10. A sheet according to claim 8 wherein said sheet is free of emulsifier other than any incidental amount of emulsifier present in said polymer of vinyl acetate.

* * * * *